(12) United States Patent
Wang et al.

(10) Patent No.: US 8,891,956 B2
(45) Date of Patent: Nov. 18, 2014

(54) METHOD AND SYSTEM FOR INCREASING TRANSPONDER SHARING FOR MESH RESTORATION IN A COMMUNICATION NETWORK

(75) Inventors: Xi Wang, Murphy, TX (US); Paparao Palacharla, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 567 days.

(21) Appl. No.: 13/151,971

(22) Filed: Jun. 2, 2011

(65) Prior Publication Data

US 2012/0237200 A1 Sep. 20, 2012

Related U.S. Application Data

(60) Provisional application No. 61/452,987, filed on Mar. 15, 2011.

(51) Int. Cl.
*H04B 10/00* (2013.01)
*H04J 14/02* (2006.01)
*H04B 10/032* (2013.01)

(52) U.S. Cl.
CPC .......... *H04B 10/032* (2013.01); *H04J 14/0268* (2013.01)
USPC ...................................... 398/5; 398/6; 398/22

(58) Field of Classification Search
CPC ............... H04B 10/032; H04J 14/0238; H04J 14/0257; H04J 14/0284; H04J 14/0295; H04J 14/0297
USPC ......................................... 398/2–6, 10–13, 22
See application file for complete search history.

(56) References Cited

U.S. PATENT DOCUMENTS

| | | | |
|---|---|---|---|
| 2007/0189663 A1* | 8/2007 | Hirai et al. ..................... | 385/24 |
| 2009/0129771 A1* | 5/2009 | Saniee et al. ..................... | 398/3 |
| 2010/0266279 A1* | 10/2010 | Sadananda ....................... | 398/48 |
| 2012/0213516 A1* | 8/2012 | Mukherjee ....................... | 398/45 |
| 2012/0275779 A1* | 11/2012 | Zhang .............................. | 398/3 |

* cited by examiner

*Primary Examiner* — Dzung Tran
(74) *Attorney, Agent, or Firm* — Baker Botts L.L.P.

(57) ABSTRACT

In accordance with embodiments of the present disclosure, a method may include for each particular working demand in a communication network, calculating a dedicated backup path for a working path of the particular working demand such that each particular backup path does not include links present in the working path. The method may also include, for each particular working demand: (i) assigning to the backup path a wavelength associated with the particular working demand; and (ii) assign to the backup path a transponder at each of the source and destination of the backup path associated with the wavelength; such that the backup path for at least one particular working demand is assigned a transponder that is also assigned to the backup path for at least one other particular working demand.

18 Claims, 3 Drawing Sheets

FIG. 1

| DEMAND NUMBER | SOURCE | DESTINATION | WORKING PATH | WAVELENGTH |
|---|---|---|---|---|
| 0 | 102a | 102b | 102a → 102b | 0 |
| 1 | 102b | 102c | 102b → 102c | 0 |
| 2 | 102a | 102c | 102a → 102b → 102c | 1 |

FIG. 4

METHOD AND SYSTEM FOR INCREASING TRANSPONDER SHARING FOR MESH RESTORATION IN A COMMUNICATION NETWORK

CROSS-REFERENCE TO RELATED APPLICATIONS

This application claims the benefit of U.S. Provisional Application No. 61/452,987 filed on Mar. 15, 2011, entitled "Transponder-Shared Mesh Restoration in Optical Networks," which is incorporated herein in its entirety.

TECHNICAL FIELD OF THE INVENTION

The present invention relates generally to communications networks and, more particularly, to a method and system for increasing transponder sharing for mesh restoration in an optical communication network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss.

To ensure high reliability and availability in communications networks, including optical communications networks, redundancy is often built into such networks, so that if a fault occurs in a particular communications path, a redundant backup communication path may be utilized. In mesh networks, utilization of a backup path in response to a fault in a primary path may be referred to as "mesh restoration."

In order to provide mesh restoration at the physical optical layer in a networking stack, specific constraints (e.g., reconfigurable optical add/drop multiplexer or ROADM constraints such as color constraints or direction constraints, for example) may require that extra transponders be pre-installed to support restoration demands of an optical network. Using known techniques for providing restoration demands in a colored, directional ROADM network, at least a pair of backup transponders may be required for each working demand in the network, thus doubling the number of installed transponders, leading to a very costly network solution.

SUMMARY

In accordance with embodiments of the present disclosure, a method may include for each particular working demand in a communication network, calculating a dedicated backup path for a working path of the particular working demand such that each particular backup path does not include links present in the working path. The method may also include, for each particular working demand: (i) assigning to the backup path a wavelength associated with the particular working demand; and (ii) assign to the backup path a transponder at each of the source and destination of the backup path associated with the wavelength; such that the backup path for at least one particular working demand is assigned a transponder that is also assigned to the backup path for at least one other particular working demand.

Certain embodiments of the invention may provide one or more technical advantages. For example, methods and systems disclosed herein may provide for a reduction in the number of transponders required for mesh restoration, as compared with existing techniques.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

Figure 1:
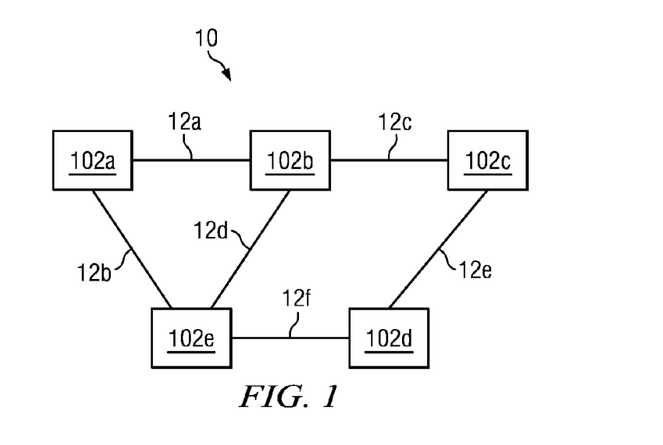
FIG. 1 illustrates a block diagram of an example network, in accordance with embodiments of the present disclosure.

FIG. 1 illustrates a block diagram of an example network 10, in accordance with certain embodiments of the present disclosure. In certain embodiments, network 10 may be an optical network. Network 10 may include one or more links 12 (e.g., links 12a-12f) to couple components of network 10 to one another. The components of network 10, coupled together by links 12, may include a plurality of network elements 102 (e.g., network elements 102a-102e). In the illustrated network 10, each network element 102 is coupled to one or more other nodes to create a mesh. However, any suitable configuration of any suitable number of network elements 102 may create network 10. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each link 12 may include any system, device, or apparatus configured to communicatively couple network devices 102 to each other and communicate information between corresponding network devices 102. For example, a link 12 may include other network elements (e.g., other than the shown network elements 102. In addition or alternatively, a link 12 may comprise transmission media may including an optical fiber, an Ethernet cable, a T1 cable, copper cable, a WiFi signal, a Bluetooth signal, or other suitable medium.

Network 10 may communicate information or "traffic" over links 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
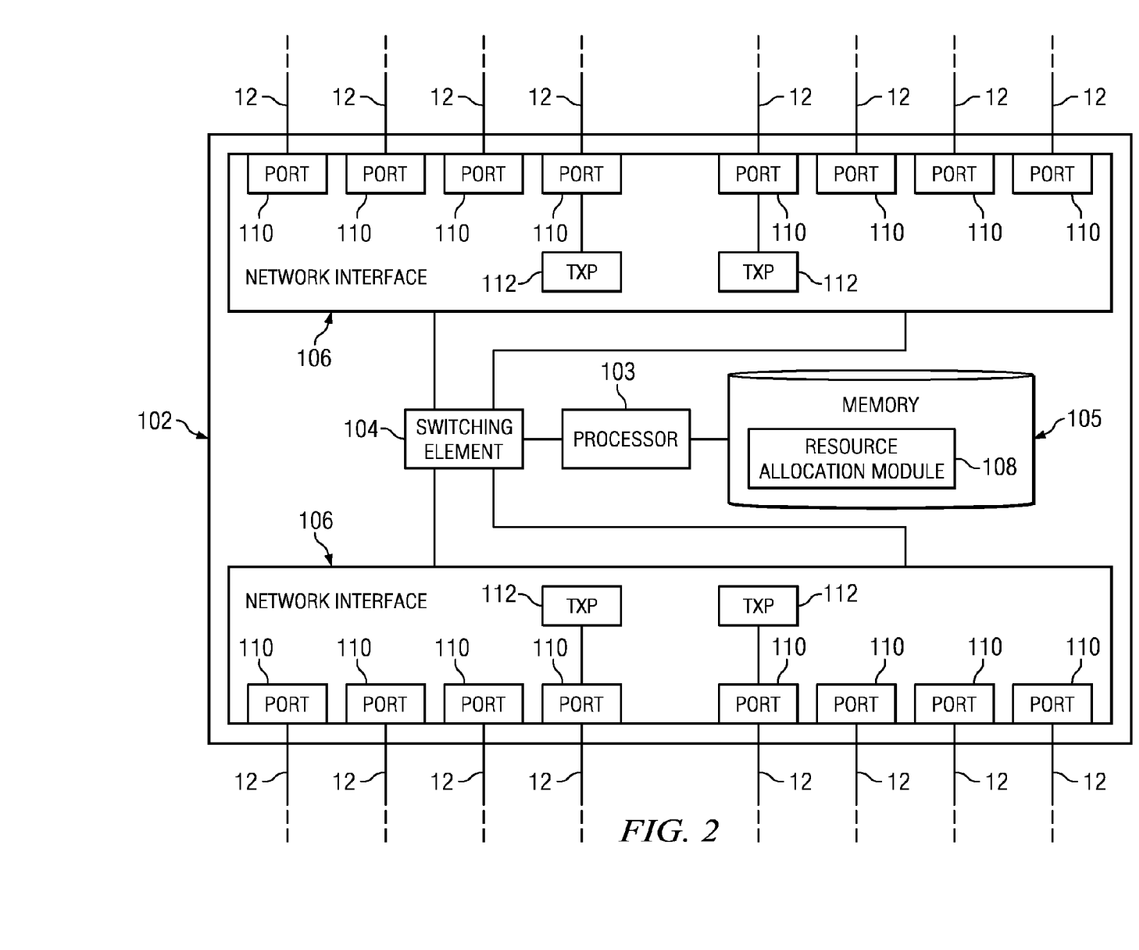
FIG. 2 illustrates a block diagram an example network element, in accordance with embodiments of the present disclosure.

FIG. 2 illustrates a block diagram an example network element 102, in accordance with certain embodiments of the present disclosure. As discussed above, each network element 102 may be coupled to one or more other network elements 102 via one or more links 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as a component independent from network interfaces 106, in some embodiments one or more processors 103 may reside on network interfaces 106 and/or other components of a network element 102.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. In certain embodiments, memory 105 may comprise a ternary content-addressable memory (TCAM). Although FIG. 2 depicts memory 105 as independent from network interfaces 106, in some embodiments one or more memories 105 may reside on network interfaces 106 and/or other components of network element 102.

As shown in FIG. 2, memory 105 may include a resource allocation module 108. Resource allocation module 108 may include any system, device, or apparatus configured to allocate resources, including transponders 112, to working demands and backup demands of network 10, as described in greater detail below. In some embodiments, resource allocation module 108 may be embodied in a program of instructions that may be read and executed by processor 103. Although resource allocation module 108 is depicted as being stored upon memory 105, in some embodiments, resource allocation module 108 may be implemented in hardware and/or firmware components of network element 102. In addition, although resource allocation module 108 is depicted as being stored upon memory 105, in some embodiments, resource allocation module 108 may be an integral component of another component of network element 102 (e.g., resource allocation module 108 may be integral to a network interface 106, or distributed among network interfaces 106 of a network element 102.

Switching element 104 may include any suitable system, apparatus, or device configured to receive traffic via a network interface and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a link 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. In these and other embodiments, one or more network interfaces may include a network processing unit (NPU).

As depicted in FIG. 2, each of network interfaces 106 may include one or more physical ports 110. Each physical port 110 may include any system, device or apparatus configured to serve as a physical interface between a corresponding link 12 and network interface 106. For example, a physical port 110 may comprise an Ethernet port, an optical port, or any other suitable port.

In addition, as shown in FIG. 2, each of network interfaces 106 may include one or more transponders 112. A transponder 112 may include any system, device, or apparatus configured to transmit via a transmission medium (e.g., and optical fiber) or receive via a transmission medium (e.g., an optical fiber) an optical signal on a particular channel or wavelength. For example, in embodiments in which a network element 102 comprises a ROADM, a signal originating in the given network element 102 may be converted from an electrical to an optical signal by a transponder 112 (e.g., following processing of the signal by other components of network element 102), and transmitted from the transponder 112 via a transmission medium on a link 12. On the other hand, a signal terminating in the given network element 102 may be received at a transponder 112 via a transmission medium and converted from an optical signal to an electrical signal (e.g., for further processing of the signal by other components of network element 102). Signals that do not originate or terminate in a given network element 102, but rather pass through a network element 102, may be received on an ingress port 110 and routed to an egress port 110 by switching element 104, and thus, such signals do not require a transponder at the given network element 102.

Figure 3:
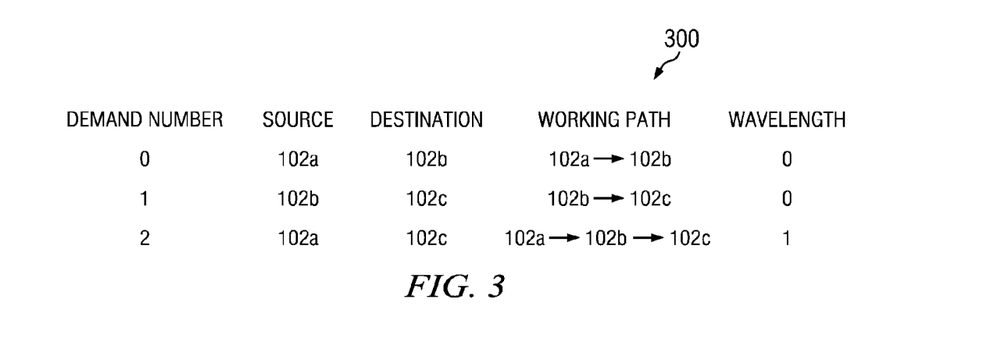
FIG. 3 illustrates an example working demand table for the example network of FIG. 1, in accordance with certain embodiments of the present disclosure.

FIG. 3 illustrates an example working demand table 300 for example network 10 of FIG. 1, in accordance with certain embodiments of the present disclosure. Network 10 and example working demand table 300 are included primarily for exposition of the methods and systems described herein. Accordingly, network 10 may have configurations different than the configuration set forth in FIG. 1 (e.g., different number of network elements 102 and/or different arrangement of links 12 between network elements 102) and working demand table 300 may include working demands different than the working demands set forth in FIG. 3. As shown in FIG. 3, each working demand may be assigned a unique identifier (e.g., column titled "DEMAND #" in FIG. 3), and each working demand may include a source and destination network element 102. Thus, each working demand represents a desired connectivity between two network elements 102 of network 10. Each working demand may be assigned a working path in accordance with an open path/shortest first algorithm, or other suitable algorithm, as is known in the art. In addition, each working demand may be assigned a wavelength or optical channel for which traffic of the working demand may be communicated.

For each working demand originating or terminating at a given network element 102, such network element 102 requires a transponder. Thus, in the example depicted in FIGS. 1 and 3, each network element 102 will require two transponders to support the working demands.

For each working demand, one or more resource allocation modules 108 of network elements 102 may determine backup paths between the source and destination network elements 102 of the working demand, such that a redundant path is available in the event of a fault within a link 12 making up a working path. For example, referring to the illustrative example set forth in FIGS. 1 and 3, a fault in link 12a may cause the working path between network elements 102a and 102b and the working path between network elements 102a and 102c to be impassable to traffic. As another example, referring again to the illustrative example set forth in FIGS. 1 and 3, a fault in link 12c may cause the working path between network elements 102b and 102c and the working path between network elements 102a and 102c to be impassable to traffic. In the event of such faults, backup paths calculated by the one or more resource allocation modules may provide redundant communication paths.

Figure 4:
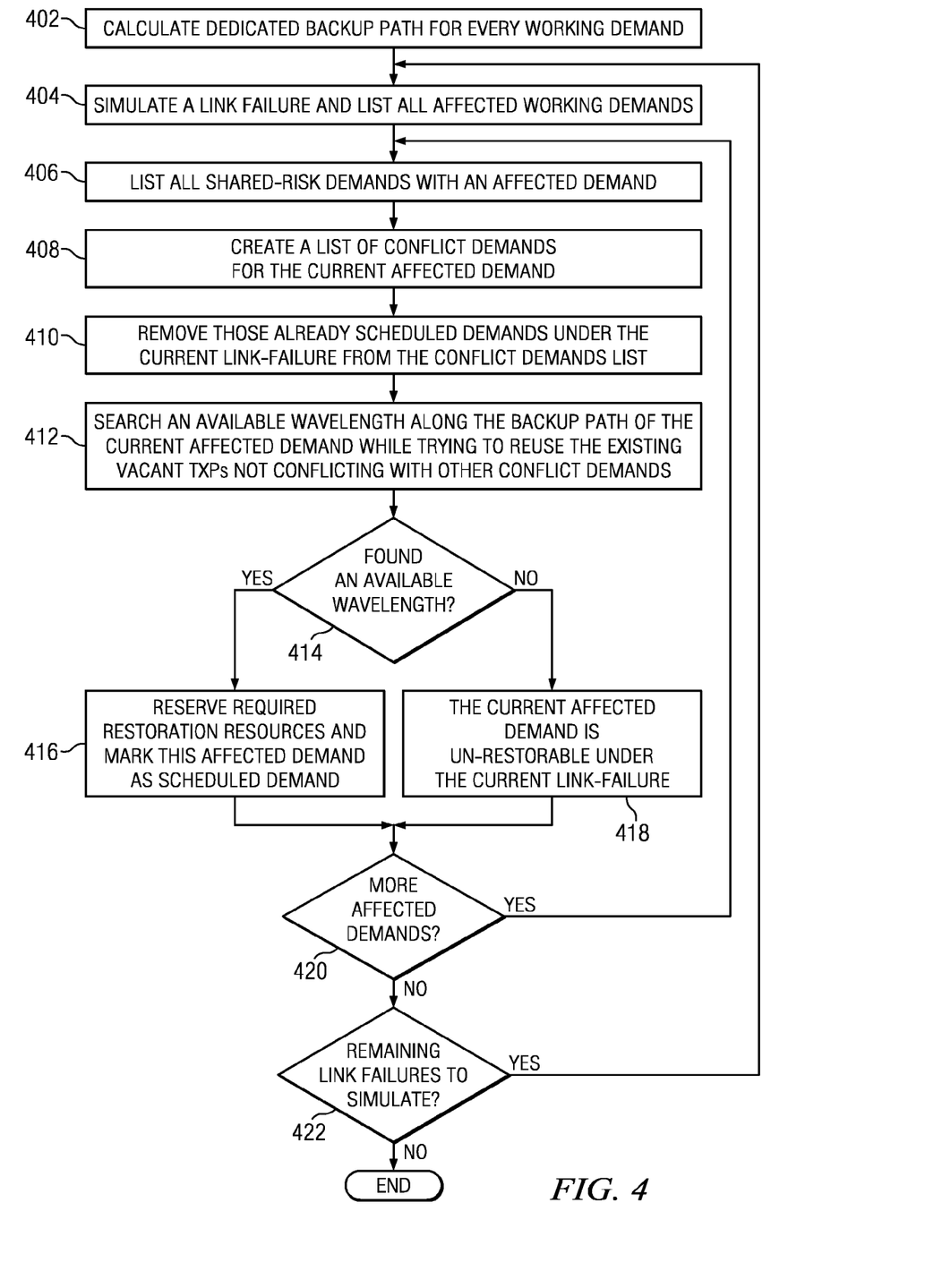
FIG. 4 illustrates a flow chart of an example method for assigning transponder resources for backup paths in a network, in accordance with embodiments of the present disclosure.

FIG. 4 illustrates a flow chart of an example method 400 for assigning transponder resources for backup paths in a network, in accordance with embodiments of the present disclosure. Method 400 may be performed by one or more of resource allocation modules 108, and/or one or more other components of network elements 102. According to one embodiment, method 400 may begin at step 402. As noted above, teachings of the present disclosure may be implemented in a variety of configurations of network 10. As such, the preferred initialization point for method 400 and the order of the steps 402-422 comprising method 400 may depend on the implementation chosen. Although method 400 may be applied to any suitable network and working demand configuration, for the purposes of exposition method 400 will be applied in the discussion below to example network 10 and the working demand configuration set forth in FIG. 3.

At step 402, one or more resource allocation modules and/or other components of one or more network elements may calculate a dedicated backup path for every demand. A backup path for a working demand may be calculated such that the backup path includes none of the links present in the working path for the working demand. For the illustrative example of FIGS. 1 and 3, backup paths for the various working paths may be as follows:

Backup path for working demand #0=102a→102e→102b
Backup path for working demand #1=102b→102e→102d→102c
Backup path for working demand #2=102a→102e→102d→102c At step 404, one or more resource allocation modules and/or other components of one or more network elements may simulate a previously-unsimulated link failure and list all affected working demands associated with the link failure. In the illustrative example of FIGS. 1 and 3, a failure of link 12a would affect working paths of working demands #0 and #2. Thus, working demands #0 and #2 are said to be affected working demands associated with the link failure of link 12a.

At step 406, one or more resource allocation modules and/or other components of one or more network elements may list all working demands that are shared risk demands with an affected demand. A shared-risk demand with respect to an affected demand is a demand that shares at least one link with the affected demand. Thus, in the illustrative example of FIGS. 1 and 3, working demand #2 is a shared-risk demand of affected working demand #0.

At step 408, one or more resource allocation modules and/or other components of one or more network elements may create a list of conflict demands for the current affected working demand being considered. A conflict demand is one in which the calculated backup paths of the working demands conflict with each other (e.g., share at least one link) In the illustrative example of FIGS. 1 and 3, working demand #2 is a conflict demand of working demand #0 as their backup paths share link 12b.

At step 410, one or more resource allocation modules and/or other components of one or more network elements may remove already scheduled backup demands under the currently-simulated link failure from the list of conflict demands. During the first iteration of step 410, no backup demands will be scheduled. Accordingly, in the running example of FIGS. 1 and 3, no conflict demands are removed during the first iteration of step 410.

At step 412, one or more resource allocation modules and/or other components of one or more network elements may search for an available wavelength along the backup path of the current affected demand. In searching for an available wavelength, one or more resource allocation modules and/or other components of one or more network elements 102 may first attempt to find available wavelengths associated with existing vacant transponders at the source and destination network elements of the backup path that do not conflict with any of the listed conflict demands for the current affected demand. Any such transponders may be reused to reduce the number of transponders required to providing backup paths.

At step 414, one or more resource allocation modules and/or other components of one or more network elements may determine if an available wavelength was found along the backup path of the current affected demand. If an available wavelength is found, method 400 may proceed to step 416. Otherwise, method 400 may proceed to step 418. In the illustrative example of FIGS. 1 and 3, all wavelengths remain available for use in the backup path of working demand #0, and thus an available wavelength is found.

At step 416, in response to an available wavelength being found, one or more resource allocation modules and/or other components of one or more network elements may reserve the found wavelength for the backup path, reserve resources for the backup path (including transponders), and mark the affected working demand as a scheduled demand. In addition, if a wavelength was found allowing for reuse of an existing vacant transponder at either of the source or destination, any such transponder may be reserved for the backup up. For purposes of the running illustrative example, it will be assumed that the backup path for working demand #0 will be assigned wavelength 0. Given that no transponders have previously been provisioned for the links interfacing to the source and destination network elements (network elements 102a and 102b, respectively) along the backup path of working demand #0, no existing transponders are available for reuse, and a previously-unprovisioned transponder will be provisioned at each of network elements 102a and 102b for the backup path. For the purposes of the running illustrative example, it will be assumed that the backup path for working demand #0 will be provisioned using a transponder labeled transponder[102a, bank 12b, wavelength 0] at network element 102a and using a transponder labeled transponder [102b, bank 12d, wavelength 0] at network element 102b.

At step 418, in response to no available wavelength for the backup path being found, one or more resource allocation modules and/or other components of one or more network elements may determine that the current affected demand is un-restorable under the link failure presently being simulated.

At step 420, one or more resource allocation modules and/or other components of one or more network elements may determine whether other affected demands exist for the link failure presently being simulated. In the running example of FIGS. 1 and 3, working demand #2 has not yet been addressed with respect to the link failure of link 12a. In other affected demands exist, method 400 may proceed again to step 406, where steps 406-418 may be repeated for each affected demand of the simulated link failure. The application of steps 406-418 to other affected demands of various link failures in the running illustrative example will be discussed below. In no other affected demands exist, method 400 may proceed to step 422.

At step 422, one or more resource allocation modules and/or other components of one or more network elements may determine if remaining unsimulated link failures exist. For example, in the running illustrative example, failures of links 12b-12f have not yet been simulated. If unsimulated link failures exist, method 400 may proceed again to step 404, where steps 404-420 may be repeated for other simulated link failures. The application of steps 404-420 to other link failures in the running illustrative example will be discussed below. In no other unsimulated link failures exist, method 400 may end.

Turning again to the running illustrative example of the application of method 400 to the network and demand configuration set forth in FIGS. 1 and 3, thus far a failure of link 12a has been simulated, affected working demand #0 associated with the link failure has been scheduled, and resources for the backup path of working demand #0 (including transponders and a communication wavelength) have been reserved. However, steps 406 and 418 have not yet been applied to affected working demand #2 associated with the failure of link 12a, and steps 404 to 420 have not been applied to simulated failures of links 12b-12f.

For working demand #2, steps 406 and 408 may identify working demand #0 as a conflict demand of working demand #2, but step 410 may remove working demand #0 from the list of conflict demands, as working demand #0 has already been scheduled. At step 412, all wavelengths except for wavelength 0 are available for the backup path of working demand #2, as wavelength 0 has already been assigned to the portion of the backup path between network element 102a and network element 102e as part of the backup path of working demand #0. For purposes of the illustrative example, it will be assumed that, in steps 412-416, working demand #2 is scheduled such that wavelength 1 is assigned to the backup path of working demand #2 and corresponding transponders may be assigned labeled as transponder[102a, bank 12b, wavelength 1] and transponder[102c, bank 12e, wavelength 1] at network elements 102a and 102c, respectively.

As for simulating failures of links 12b-12f, it is noted that no working paths are routed along links 12b, 12c, 12e, and 12f. Thus, no affected demands exist with respect to simulated link failures of such links. However, a simulated link failure of link 12c has affected working demands of working demand #1 and working demand #2. For working demand #1, steps 406 and 408 may identify working demand #2 as a conflict demand of working demand #1, but step 410 may remove working demand #0 from the list of conflict demands, as working demand #2 has already been scheduled. At step 412, all wavelengths except for wavelength 1 are available for the backup path of working demand #1, as wavelength 1 has already been assigned to the portion of the backup path comprising network elements 102e, 102d, and 102c as part of the backup path of working demand #2. However, of the available wavelengths, it may be determined at step 412 that the use of wavelength 0 for the backup path of working demand #1 may reuse already-provisioned transponder [102b, bank 12d, wavelength 0], as the transponder will not conflict with any conflict demands. Accordingly, in steps 412-416, working demand #1 may be scheduled such that wavelength 0 is assigned to the backup path of working demand #1, transponders transponder[102b, bank 12d, wavelength 0] may be reused and assigned to the backup path of working demand #1, and a transponder labeled as transponder[102c, bank 12e, wavelength 0] may also be assigned to the backup path.

Accordingly, for each working path, one or more resource allocation modules and/or other components of one or more network elements may attempt to reserve resources for backup paths for each working path, and, provision each such backup path to, if available, use transponders provisioned for the backup paths of other provisioned backup paths.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using network 10 or any other system operable to implement method 400. In certain embodiments, method 400 may be implemented partially or fully in software and/or firmware embodied in computer-readable media.

A component of network 10 and/or a network element 102 may include an interface, logic, memory, and/or other suitable element. An interface receives input, sends output, processes the input and/or output, and/or performs other suitable operations. An interface may comprise hardware and/or software. Logic performs the operations of the component, for example, executes instructions to generate output from input.

Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   for each particular working demand in a communication network, calculating a dedicated backup path for a working path of the particular working demand such that each particular backup path does not include links present in the working path; and
   for each particular working demand:
      assigning to the backup path a wavelength associated with the particular working demand; and
      assigning to the backup path a transponder at each of the source and destination of the backup path associated with the wavelength;
      such that the backup path for at least one particular working demand is assigned a transponder that is also assigned to the backup path for at least one other particular working demand.

2. A method according to claim 1, wherein assigning to the backup path the wavelength and the transponders at each of the source and destination of the backup path comprises:
   for each link in the communication network, simulating a link failure;
   for each particular simulated link failure, determining all working demands affected by the particular simulated link failure; and
   for each particular affected working demand:
      determining if one or more available wavelengths exist, each available wavelength comprising a wavelength that is not yet assigned to a conflict demand of the particular affected working demand, wherein a conflict demand comprises:
         a working demand whose working path shares a link with the working path of the particular affected working demand;
         a working demand whose backup path shares a link with the backup path of the particular affected working demand; and
      if one or more available wavelengths exist, assigning the backup path of the particular working demand to one of the one or more available wavelengths.

3. A method according to claim 2, further comprising determining if one of the one or more available wavelengths is associated with a transponder of at least one of the source and destination of the backup path, wherein the transponder is:
   assigned to a backup path of a working demand that does not share a link with the working path of the particular affected working demand; and
   not already assigned to a conflict demand.

4. A method according to claim 1, wherein the communication network is an optical communication network.

5. A method according to claim 4, wherein the communication network is a colored and directional reconfigurable add/drop multiplexer network.

6. A method according to claim 1, where the backup path for the at least one particular working demand is assigned a transponder that is also assigned to the backup path for the at least one other particular working demand if the at least one particular working demand and the at least one other particular working demand are not conflict demands of one another.

7. A network element comprising:
   a processor; and
   a resource allocation module communicatively coupled to the processor and configured to, either individually or in concert with one or more other resource allocation modules integral to one or more other network elements:
      for each particular working demand in a communication network including the network element, calculate a dedicated backup path for a working path of the particular working demand such that each particular backup path does not include links present in the working path; and
      for each particular working demand:
         assign to the backup path a wavelength associated with the particular working demand; and
         assign to the backup path a transponder at each of the source and destination of the backup path associated with the wavelength;
         such that the backup path for at least one particular working demand is assigned a transponder that is also assigned to the backup path for at least one other particular working demand.

8. A network element according to claim 7, the resource allocation module further configured to, either individually or in concert with one or more other resource allocation modules integral to one or more other network elements, assign to the backup path the wavelength and the transponders at each of the source and destination of the backup path by:
   for each link in the communication network, simulating a link failure;
   for each particular simulated link failure, determining all working demands affected by the particular simulated link failure; and
   for each particular affected working demand:
      determining if one or more available wavelengths exist, each available wavelength comprising a wavelength that is not yet assigned to a conflict demand of the particular affected working demand, wherein a conflict demand comprises:

a working demand whose working path shares a link with the working path of the particular affected working demand;

a working demand whose backup path shares a link with the backup path of the particular affected working demand; and if one or more available wavelengths exist, assigning the backup path of the particular working demand to one of the one or more available wavelengths.

9. A network element according to claim 8, resource allocation module further configured to, either individually or in concert with one or more other resource allocation modules integral to one or more other network elements, determine if one of the one or more available wavelengths is associated with a transponder of at least one of the source and destination of the backup path, wherein the transponder is:

assigned to a backup path of a working demand that does not share a link with the working path of the particular affected working demand; and not already assigned to a conflict demand.

10. A network element according to claim 7, wherein the communication network is an optical communication network.

11. A network element according to claim 10, wherein the communication network is a colored and directional reconfigurable add/drop multiplexer network.

12. A network element according to claim 7, where the backup path for the at least one particular working demand is assigned a transponder that is also assigned to the backup path for the at least one other particular working demand if the at least one particular working demand and the at least one other particular working demand are not conflict demands of one another.

13. An article of manufacture, comprising:

a non-transitory computer readable medium;

computer-executable instructions carried on the computer readable medium, the instructions readable by a processor, the instructions, when read and executed, for causing the processor to:

for each particular working demand in a communication network, calculate a dedicated backup path for a working path of the particular working demand such that each particular backup path does not include links present in the working path; and for each particular working demand:

assign to the backup path a wavelength associated with the particular working demand; and assign to the backup path a transponder at each of the source and destination of the backup path associated with the wavelength;

such that the backup path for at least one particular working demand is assigned a transponder that is also assigned to the backup path for at least one other particular working demand.

14. An article of manufacture according to claim 13, wherein, in order to assign to the backup path the wavelength and the transponders at each of the source and destination of the backup path, the processor further caused to:

for each link in the communication network, simulate a link failure;

for each particular simulated link failure, determine all working demands affected by the particular simulated link failure; and for each particular affected working demand:

determine if one or more available wavelengths exist, each available wavelength comprising a wavelength that is not yet assigned to a conflict demand of the particular affected working demand, wherein a conflict demand comprises:

a working demand whose working path shares a link with the working path of the particular affected working demand;

a working demand whose backup path shares a link with the backup path of the particular affected working demand; and if one or more available wavelengths exist, assign the backup path of the particular working demand to one of the one or more available wavelengths.

15. An article of manufacture according to claim 14, the processor further caused to determine if one of the one or more available wavelengths is associated with a transponder of at least one of the source and destination of the backup path, wherein the transponder is:

assigned to a backup path of a working demand that does not share a link with the working path of the particular affected working demand; and not already assigned to a conflict demand.

16. An article of manufacture according to claim 13, wherein the communication network is an optical communication network.

17. An article of manufacture according to claim 16, wherein the communication network is a colored and directional reconfigurable add/drop multiplexer network.

18. An article of manufacture according to claim 13, where the backup path for the at least one particular working demand is assigned a transponder that is also assigned to the backup path for the at least one other particular working demand if the at least one particular working demand and the at least one other particular working demand are not conflict demands of one another.

* * * * *

UNITED STATES PATENT AND TRADEMARK OFFICE
CERTIFICATE OF CORRECTION

| | | |
|---|---|---|
| PATENT NO. | : 8,891,956 B2 | Page 1 of 1 |
| APPLICATION NO. | : 13/151971 | |
| DATED | : November 18, 2014 | |
| INVENTOR(S) | : Xi Wang et al. | |

It is certified that error appears in the above-identified patent and that said Letters Patent is hereby corrected as shown below:

In the claims:

Column 11, Line 37: After "computer-executable instructions carried on the" and before "computer" insert -- non-transitory --.

Signed and Sealed this
Thirty-first Day of March, 2015

Michelle K. Lee
*Director of the United States Patent and Trademark Office*